United States Patent
Wang et al.

(10) Patent No.: US 11,523,104 B2
(45) Date of Patent: Dec. 6, 2022

(54) METHODS FOR CONSTRUCTING A MERGE CANDIDATE LIST

(71) Applicant: ALIBABA GROUP HOLDING LIMITED, Grand Cayman (KY)

(72) Inventors: Zhao Wang, Beijing (CN); Yan Ye, San Mateo, CA (US); Jiancong Luo, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/996,242

(22) Filed: Aug. 18, 2020

(65) Prior Publication Data
US 2021/0092357 A1  Mar. 25, 2021

Related U.S. Application Data

(60) Provisional application No. 62/902,790, filed on Sep. 19, 2019.

(51) Int. Cl.
| | | |
|---|---|---|
| H04N 19/176 | (2014.01) | |
| H04N 19/423 | (2014.01) | |
| H04N 19/159 | (2014.01) | |
| H04N 19/105 | (2014.01) | |

(52) U.S. Cl.
CPC ......... *H04N 19/105* (2014.11); *H04N 19/159* (2014.11); *H04N 19/176* (2014.11); *H04N 19/423* (2014.11)

(58) Field of Classification Search
CPC .................................................. H04N 19/105
See application file for complete search history.

(56) References Cited

U.S. PATENT DOCUMENTS

| | | | |
|---|---|---|---|
| 9,338,459 B2 | 5/2016 | Oh et al. | |
| 10,194,133 B2* | 1/2019 | Bang | ...................... H04N 19/44 |
| 10,491,902 B1* | 11/2019 | Xu | ........................ H04N 19/573 |
| 10,812,810 B2* | 10/2020 | Ye | ........................... H04N 19/46 |
| 2013/0287116 A1* | 10/2013 | Helle | ................... H04N 19/176 |
| | | | 375/240.24 |

(Continued)

OTHER PUBLICATIONS

"Requirements for a Future Video Coding Standard v5," International Organisation for Standardisation, Torino, IT, 14 pages (2017).

(Continued)

*Primary Examiner* — Irfan Habib
(74) *Attorney, Agent, or Firm* — Finnegan, Henderson, Farabow, Garrett & Dunner, LLP

(57) ABSTRACT

The present disclosure provides systems and methods for constructing a merge candidate list used for video processing. One exemplary method includes: inserting a set of spatial merge candidates to a merge candidate list of a coding block, wherein the set of spatial merge candidates are inserted according to an order of: top neighboring block, left neighboring block, top neighboring block, left neighboring block and above-left neighboring block. The method can further include adding to the merge candidate list at least one of: a temporal merge candidate from collocated coding units, a history-based motion vector predictor (HMVP) from a First-In, First-Out (FIFO) table, a pairwise average candidate, or a zero motion vector.

19 Claims, 23 Drawing Sheets

Positions of spatial merge candidates

(56) References Cited

U.S. PATENT DOCUMENTS

| | | | | |
|---|---|---|---|---|
| 2015/0117543 A1* | 4/2015 | Hong | H04N 19/533 |
| | | | | 375/240.16 |
| 2015/0131733 A1 | 5/2015 | Kim et al. | |
| 2017/0310988 A1* | 10/2017 | Lin | H04N 19/513 |
| 2017/0347093 A1* | 11/2017 | Yu | H04N 21/2383 |
| 2018/0242024 A1* | 8/2018 | Chen | H04N 19/159 |
| 2018/0249154 A1* | 8/2018 | Chuang | H04N 19/567 |
| 2018/0359483 A1* | 12/2018 | Chen | H04N 19/70 |
| 2019/0246118 A1* | 8/2019 | Ye | H04N 19/44 |
| 2020/0186825 A1* | 6/2020 | Rusanovskyy | H04N 19/105 |
| 2020/0275093 A1* | 8/2020 | Lin | H04N 19/159 |
| 2020/0280728 A1* | 9/2020 | Ye | H04N 19/52 |
| 2020/0413081 A1* | 12/2020 | Rusanovskyy | H04N 19/105 |
| 2021/0014484 A1* | 1/2021 | Kotra | H04N 19/176 |
| 2021/0037238 A1* | 2/2021 | Park | H04N 19/105 |
| 2021/0105499 A1* | 4/2021 | Lee | H04N 19/109 |
| 2021/0306661 A1* | 9/2021 | Ahn | H04N 19/105 |
| 2021/0392337 A1* | 12/2021 | Lim | H04N 19/137 |
| 2022/0070448 A1* | 3/2022 | Kim | H04N 19/54 |
| 2022/0078407 A1* | 3/2022 | Zhao | H04N 19/176 |
| 2022/0078470 A1* | 3/2022 | Lee | H04N 19/583 |
| 2022/0109835 A1* | 4/2022 | Lee | H04N 19/54 |
| 2022/0116594 A1* | 4/2022 | Park | H04N 19/105 |
| 2022/0182614 A1* | 6/2022 | Jang | H04N 19/593 |

OTHER PUBLICATIONS

Bross et al., "Versatile Video Coding (Draft 5)," JVET-N1001-v8, 14th Meeting: Geneva, CH Mar. 19-27, 2019, 300 pages.

Bross et al., "Versatile Video Coding (Draft 6)," JVET-O2001-vE, 15th Meeting: Gothenburg, SE, Jul. 3-12, 2019, 455 pages.

Chen et al., Algorithm description for Versatile Video Coding and Test Model 5 (VTM 5), JVET-N1002-v2, 14th Meeting: Geneva, CH Mar. 19-27, 2019, 77 pages.

Chen et al., "Algorithm Description of Joint Exploration Test Model 7 (JEM 7)," JVET-G1001-v1, 7th Meeting: Torino, IT, Jul. 13-21, 2017, 50 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://jvet.hhi.fraunhofer.de/svn/svn_HMJEMSoftware.

PCT International Search Report and Written Opinion dated Nov. 18, 2020, issued in corresponding International Application No. PCT/US2020/046799 (7 pgs.).

Sullivan et al., "Overview of the High Efficiency Video Coding (HEVC) Standard," IEE Transactions on Circuits and Systems for Video Technology, vol. 22, No. 12, pp. 1649-1668 (2012).

* cited by examiner

Positions of spatial merge candidates

Positions of temporal merge candidates

Scaling of temporal merge candidates

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

FIG. 6

Relation of distance index and pre-defined offset in MMVD

Positions of spatial merge candidates

| | Random access Main10 Over VTM-6 | | | | |
|---|---|---|---|---|---|
| | Y | U | V | EncT | DecT |
| Class A1 | -0.05% | -0.05% | -0.05% | 100% | 100% |
| Class A2 | 0.01% | -0.04% | -0.01% | 100% | 100% |
| Class B | -0.05% | 0.08% | -0.01% | 100% | 100% |
| Class C | -0.09% | -0.07% | -0.05% | 100% | 100% |
| Class E | | | | | |
| Overall | -0.05% | -0.01% | -0.03% | 100% | 100% |
| Class D | -0.09% | 0.04% | 0.21% | 100% | 100% |
| Class F | -0.04% | -0.05% | -0.02% | 100% | 100% |

Experimental results compared to VTM-6 under RA configuration

FIG. 8

|  | Lowdelay Main10 Over VTM-6 | | | | |
| --- | --- | --- | --- | --- | --- |
|  | Y | U | V | EncT | DecT |
| Class A1 |  |  |  |  |  |
| Class A2 |  |  |  |  |  |
| Class B | -0.06% | -0.09% | -0.24% | 100% | 100% |
| Class C | -0.18% | -0.15% | -0.06% | 100% | 100% |
| Class E | -0.50% | -0.10% | -0.43% | 100% | 100% |
| Overall | -0.21% | -0.11% | -0.23% | 100% | 100% |
| Class D | -0.11% | -0.02% | 0.42% | 100% | 100% |
| Class F | 0.08% | 0.00% | 1.50% | 100% | 100% |

Experimental results compared to VTM-6 under LD configuration

FIG. 9

| | Random access Main10 Over VTM-6 | | | | |
|---|---|---|---|---|---|
| | Y | U | V | EncT | DecT |
| Class A1 | 0.01% | 0.08% | -0.01% | 100% | 100% |
| Class A2 | 0.06% | 0.12% | 0.10% | 100% | 100% |
| Class B | -0.01% | 0.13% | 0.09% | 100% | 100% |
| Class C | -0.06% | -0.01% | 0.02% | 100% | 100% |
| Class E | | | | | |
| Overall | 0.00% | 0.08% | 0.05% | 100% | 100% |
| Class D | -0.06% | 0.01% | 0.10% | 100% | 100% |
| Class F | 0.00% | -0.02% | 0.00% | 100% | 100% |

FIG. 10

Experimental results compared to VTM-6 under RA configuration

| | Lowdelay Main10 Over VTM-6 | | | | |
|---|---|---|---|---|---|
| | Y | U | V | EncT | DecT |
| Class A1 | | | | | |
| Class A2 | | | | | |
| Class B | -0.01% | 0.06% | 0.13% | 100% | 100% |
| Class C | -0.08% | -0.13% | -0.05% | 100% | 100% |
| Class E | -0.30% | 0.21% | -0.18% | 100% | 100% |
| Overall | -0.10% | 0.03% | -0.01% | 100% | 100% |
| Class D | -0.05% | -0.05% | 0.89% | 100% | 100% |
| Class F | 0.11% | -0.04% | 0.14% | 100% | 100% |

Experimental results compared to VTM-6 under LD configuration

FIG. 11

| | Descriptor |
|---|---|
| slice_header( ) { | |
| ... | |
|   if( slice_type != I ) { | |
|     num_spatial_merge_cand_minus2 | ue(v) |
|     if( sps_temporal_mvp_enabled_flag && !pps_temporal_mvp_enabled_idc ) | |
|       slice_temporal_mvp_enabled_flag | u(1) |
|     if( slice_type == B && !pps_mvd_l1_zero_idc ) | |
|       mvd_l1_zero_flag | u(1) |
|     if( cabac_init_present_flag ) | |
|       cabac_init_flag | u(1) |
|     if( slice_temporal_mvp_enabled_flag ) { | |
|       if( slice_type == B && !pps_collocated_from_l0_idc ) | |
|         collocated_from_l0_flag | u(1) |
|       if( ( collocated_from_l0_flag && NumRefIdxActive[ 0 ] > 1 ) \|\| <br>         ( !collocated_from_l0_flag && NumRefIdxActive[ 1 ] > 1 ) ) | |
|         collocated_ref_idx | ue(v) |
|   } | |
|   ... | |
|   } | |
| ... | |
| } | |

1201 points to `num_spatial_merge_cand_minus2`

Exemplary syntax structure of slice header

FIG. 12

| | Descriptor |
|---|---|
| seq_parameter_set_rbsp( ) { | |
| ... | |
| sps_temporal_mvp_enabled_flag | u(1) |
| if( sps_temporal_mvp_enabled_flag ) | |
| sps_sbtmvp_enabled_flag | u(1) |
| num_spatial_merge_cand_minus2_non_lowdelay | ue(v) |
| num_spatial_merge_cand_minus2_lowdelay | ue(v) |
| sps_amvr_enabled_flag | u(1) |
| sps_bdof_enabled_flag | u(1) |
| ... | |
| } | |

(1301 brace indicating num_spatial_merge_cand_minus2_non_lowdelay and num_spatial_merge_cand_minus2_lowdelay)

Exemplary syntax structure of SPS

FIG. 13

| | Descriptor |
|---|---|
| pic_parameter_set_rbsp( ) { | |
| ... | |
| constant_slice_header_params_enabled_flag | u(1) |
| if( constant_slice_header_params_enabled_flag ) { | |
| pps_dep_quant_enabled_idc | u(2) |
| for( i = 0; i < 2; i++ ) | |
| pps_ref_pic_list_sps_idc[ i ] | u(2) |
| pps_temporal_mvp_enabled_idc | u(2) |
| num_spatial_merge_cand_minus2_non_lowdelay | ue(v) |
| num_spatial_merge_cand_minus2_lowdelay | ue(v) |
| pps_mvd_l1_zero_idc | u(2) |
| pps_collocated_from_l0_idc | u(2) |
| pps_six_minus_max_num_merge_cand_plus1 | ue(v) |
| pps_five_minus_max_num_subblock_merge_cand_plus1 | ue(v) |
| pps_max_num_merge_cand_minus_max_num_triangle_cand_minus1 | ue(v) |
| } | |
| ... | |
| } | |

⌐ 1401

Exemplary syntax structure of PPS

FIG. 14

| | Random access Main10 Over VTM-6 | | | | |
|---|---|---|---|---|---|
| | Y | U | V | EncT | DecT |
| Class A1 | -0.07% | -0.14% | -0.09% | 100% | 100% |
| Class A2 | 0.00% | 0.03% | 0.04% | 100% | 100% |
| Class B | -0.07% | 0.00% | 0.04% | 100% | 100% |
| Class C | -0.11% | -0.05% | -0.02% | 100% | 100% |
| Class E | | | | | |
| Overall | -0.07% | -0.04% | 0.00% | 100% | 100% |
| Class D | -0.12% | -0.09% | -0.12% | 100% | 100% |
| Class F | -0.03% | 0.00% | -0.02% | 100% | 100% |

Experimental results compared to VTM-6 under RA configuration

FIG. 15

|  | Lowdelay Main10 Over VTM-6 | | | | |
|---|---|---|---|---|---|
|  | Y | U | V | EncT | DecT |
| Class A1 |  |  |  |  |  |
| Class A2 |  |  |  |  |  |
| Class B | -0.05% | -0.03% | -0.19% | 100% | 100% |
| Class C | -0.12% | -0.04% | -0.10% | 100% | 100% |
| Class E | -0.41% | 0.04% | -0.05% | 100% | 100% |
| Overall | -0.16% | -0.02% | -0.12% | 100% | 100% |
| Class D | -0.10% | -0.02% | 0.64% | 100% | 100% |
| Class F | 0.07% | -0.09% | 0.82% | 100% | 100% |

Experimental results compared to VTM-6 under LD configuration

FIG. 16

| | Random access Main10 Over VTM-6 | | | | |
|---|---|---|---|---|---|
| | Y | U | V | EncT | DecT |
| Class A1 | -0.09% | -0.02% | -0.03% | 100% | 100% |
| Class A2 | -0.01% | -0.05% | -0.06% | 100% | 100% |
| Class B | -0.08% | 0.08% | 0.01% | 100% | 100% |
| Class C | -0.12% | -0.13% | -0.08% | 100% | 100% |
| Class E | | | | | |
| Overall | -0.08% | -0.02% | -0.04% | 100% | 100% |
| Class D | -0.09% | -0.01% | 0.09% | 100% | 100% |
| Class F | -0.02% | -0.03% | 0.00% | 100% | 100% |

FIG. 17

Experimental results compared to VTM-6 under RA configuration

| | Lowdelay Main10 Over VTM-6 | | | | |
|---|---|---|---|---|---|
| | Y | U | V | EncT | DecT |
| Class A1 | | | | | |
| Class A2 | | | | | |
| Class B | -0.06% | -0.09% | -0.24% | 100% | 100% |
| Class C | -0.18% | -0.15% | -0.06% | 100% | 100% |
| Class E | -0.50% | -0.10% | -0.43% | 100% | 100% |
| Overall | -0.21% | -0.11% | -0.23% | 100% | 100% |
| Class D | -0.11% | -0.02% | 0.42% | 100% | 100% |
| Class F | 0.08% | 0.00% | 1.50% | 100% | 100% |

Experimental results compared to VTM-6 under LD configuration

FIG. 18

METHODS FOR CONSTRUCTING A MERGE CANDIDATE LIST

CROSS-REFERENCE TO RELATED APPLICATIONS

The present disclosure claims priority to U.S. provisional application No. 62/902,790, filed on Sep. 19, 2019, which is incorporated herein by reference in its entirety.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of the present disclosure provide methods for constructing a merge candidate list. According to some embodiments, one exemplary method includes: inserting a set of spatial merge candidates to a merge candidate list of a coding block, wherein the set of spatial merge candidates are inserted according to an order of: top neighboring block, left neighboring block, top neighboring block, left neighboring block and above-left neighboring block.

According to some embodiments, one exemplary method includes: inserting a set of spatial merge candidates to a merge candidate list of a coding block, based on a preset number limit. If the number limit is 2, the set of spatial merge candidates are inserted into the merge candidate list based on the following order: top neighboring block, left neighboring block. If the number limit is 3, the set of spatial merge candidates are inserted into the merge candidate list based on the following order: top neighboring block, left neighboring block, top neighboring block.

According to some embodiments, one exemplary method includes inserting a set of spatial merge candidates to a merge candidate list of a coding block, wherein: when a first coding mode is applied to the coding block, the set of spatial merge candidates are inserted according to a first construction order; and when a second coding mode is applied to the coding block, the set of spatial merge candidates are inserted according to a second construction order, the first construction order being different from the second construction order.

According to some embodiments, one exemplary method includes inserting a set of spatial merge candidates to a merge candidate list of a coding block, wherein: when the coding block is part of low-delay pictures, the set of spatial merge candidates are inserted according to a first construction order; and when the coding block is part of non-low-delay pictures, the set of spatial merge candidates are inserted according to a second construction order, the first construction order being different from the second construction order.

BRIEF DESCRIPTION OF THE DRAWINGS

Embodiments and various aspects of the present disclosure are illustrated in the following detailed description and the accompanying figures. Various features shown in the figures are not drawn to scale.

FIG. 6 illustrates an exemplary relationship of the distance index and the pre-defined offset in the merge mode with motion vector difference (MMVD), consistent with embodiments of the disclosure.

FIG. 8 illustrates exemplary experimental results compared to VTM-6 under random access (RA) configuration, consistent with embodiments of the disclosure.

FIG. 9 illustrates exemplary experimental results compared to VTM-6 under low-delay (LD) configuration, consistent with embodiments of the disclosure.

FIG. 10 illustrates exemplary experimental results compared to VTM-6 under RA configuration, consistent with embodiments of the disclosure.

FIG. 11 illustrates exemplary experimental results compared to VTM-6 under LD configuration, consistent with embodiments of the disclosure.

FIG. 12 illustrates an exemplary syntax structure of the slice header, consistent with embodiments of the disclosure.

FIG. 13 illustrates an exemplary syntax structure of the sequence parameter set (SPS), consistent with embodiments of the disclosure.

FIG. 14 illustrates an exemplary syntax structure of the picture parameter set (PPS), consistent with embodiments of the disclosure.

FIG. 15 illustrates exemplary experimental results compared to VTM-6 under RA configuration, consistent with embodiments of the disclosure.

FIG. 16 illustrates exemplary experimental results compared to VTM-6 under LD configuration, consistent with embodiments of the disclosure.

FIG. 17 illustrates exemplary experimental results compared to VTM-6 under RA configuration, consistent with embodiments of the disclosure.

FIG. 18 illustrates exemplary experimental results compared to VTM-6 under LD configuration, consistent with embodiments of the disclosure.

DETAILED DESCRIPTION

Figure 1:
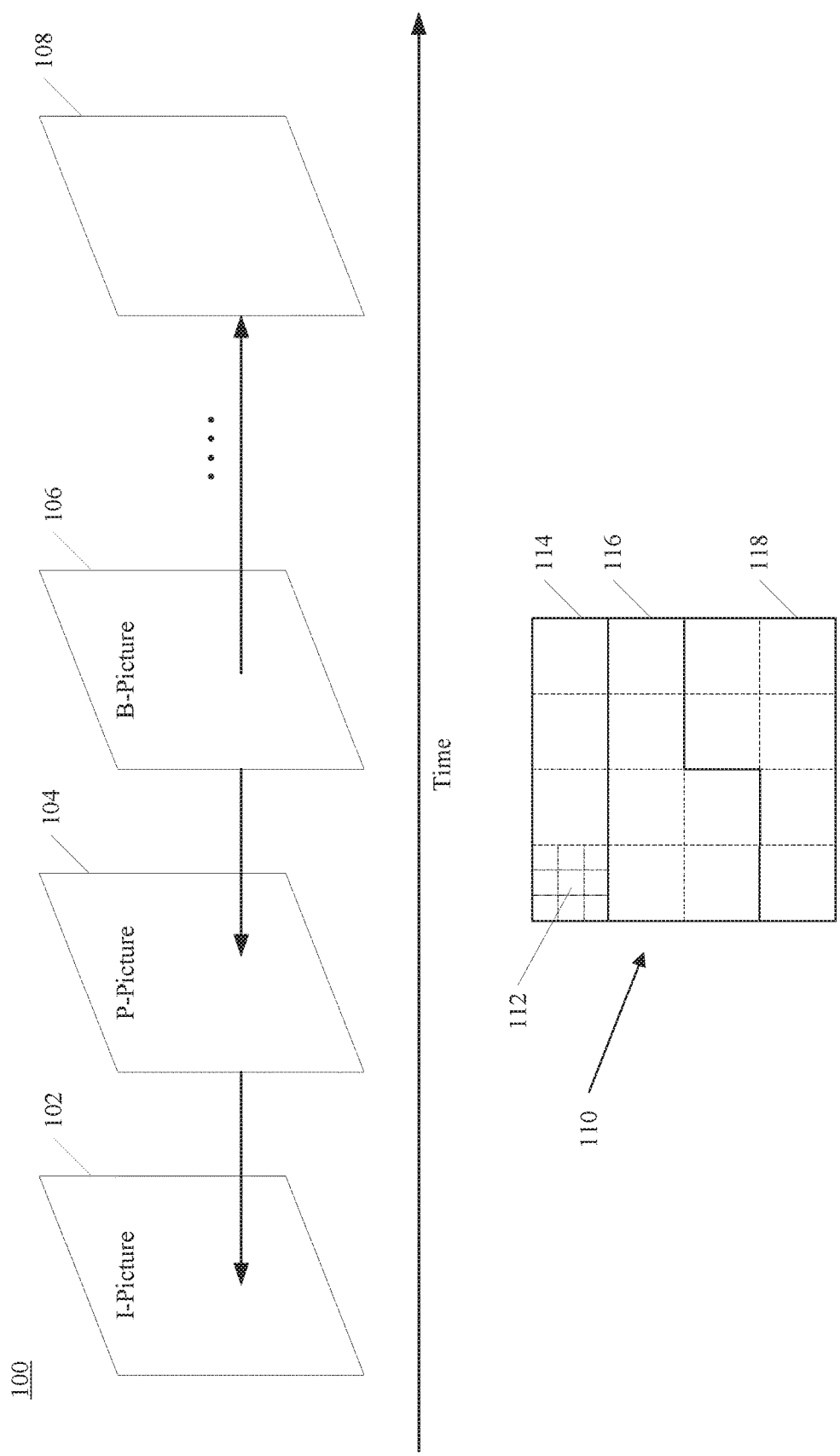
FIG. 1 illustrates structures of an example video sequence, according to some embodiments of this disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. Particular aspects of the present disclosure are described in greater detail below. The terms and definitions provided herein control, if in conflict with terms and/or definitions incorporated by reference.

As stated above, video is frames arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") includes changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard continues to include more coding technologies that provide better compression performance. VVC is based on the same hybrid video coding system that has been used in modern video compression standards such as HEVC, H.264/AVC, MPEG2, H.263, etc. In VVC, a merge candidate list that includes new merge candidates can be constructed. For different inter modes, different merge list sizes are applied. The embodiments of the present disclosure take into account new merge candidates (e.g. HMVP, pairwise average) and the new inter modes (e.g. MMVD, TPM) in VVC. For example, the order of spatial merge candidates can be improved, the number of spatial merge candidates can be adjusted. Further, the construction of spatial merge candidates is fixed for the regular mode, MMVD and TPM modes, and the construction of spatial merge candidates is fixed for the regular mode, MMVD and TPM modes.

FIG. 1 illustrates structures of an example video sequence 100, according to some embodiments of this disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266NVC), at the level of which the prediction operation can be performed.

For another example, at a transform stage (an example of which will be detailed in FIG. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266NVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
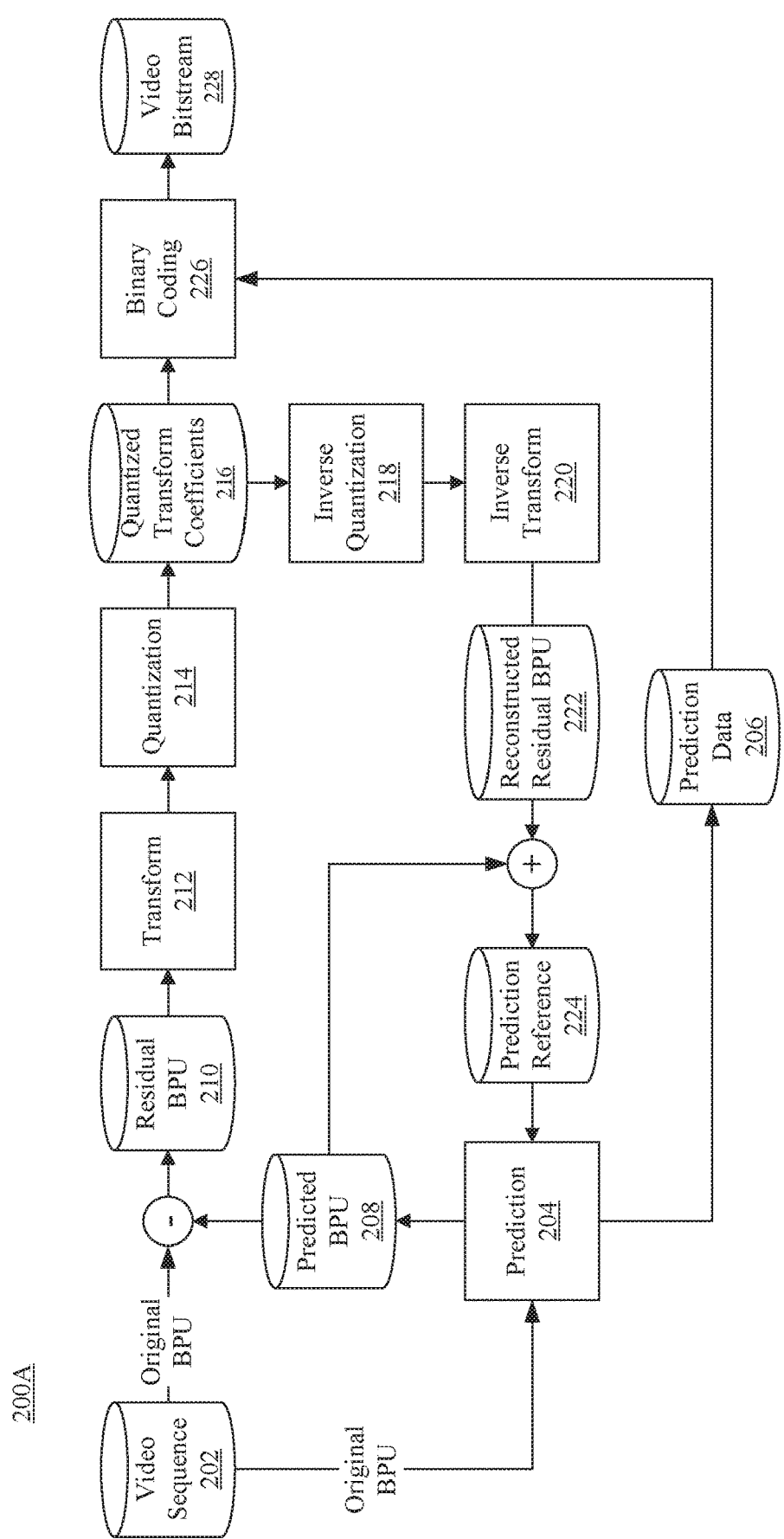
FIG. 2A illustrates a schematic diagram of an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
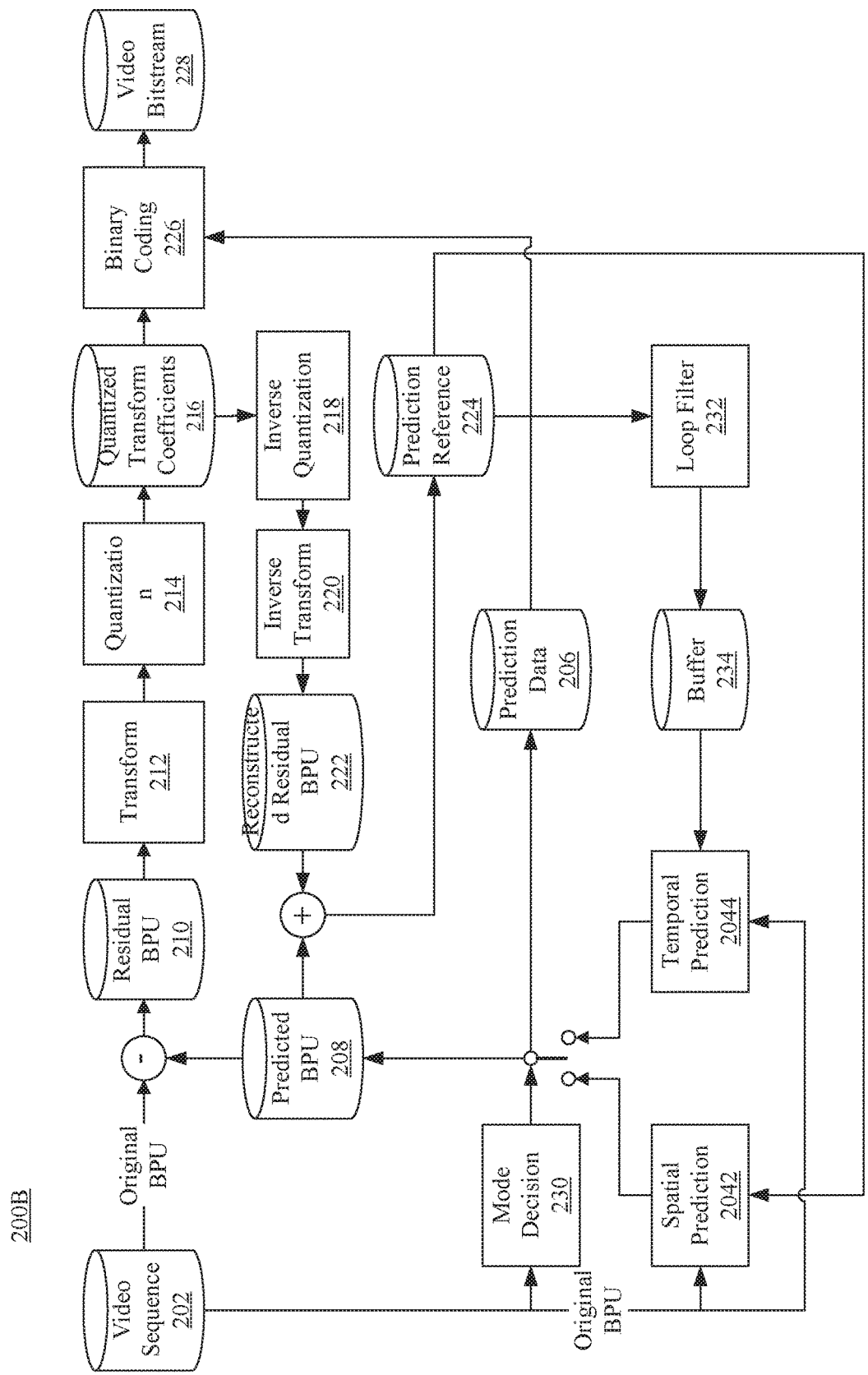
FIG. 2B illustrates a schematic diagram of another exemplary encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
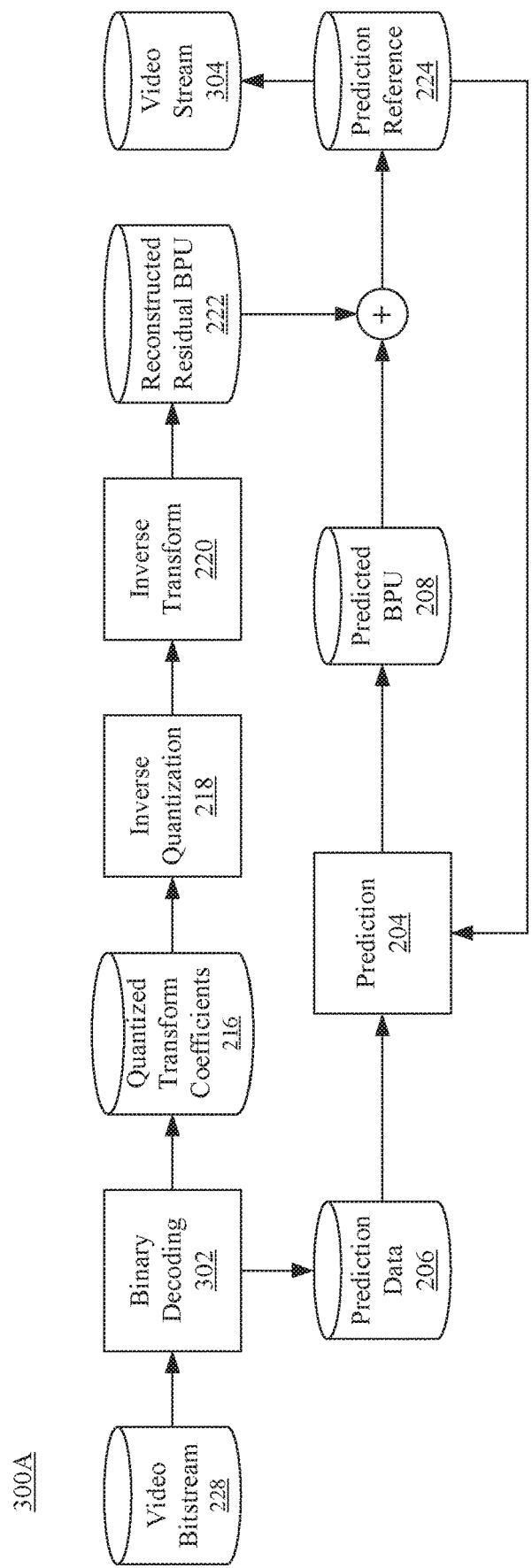
FIG. 3A illustrates a schematic diagram of an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
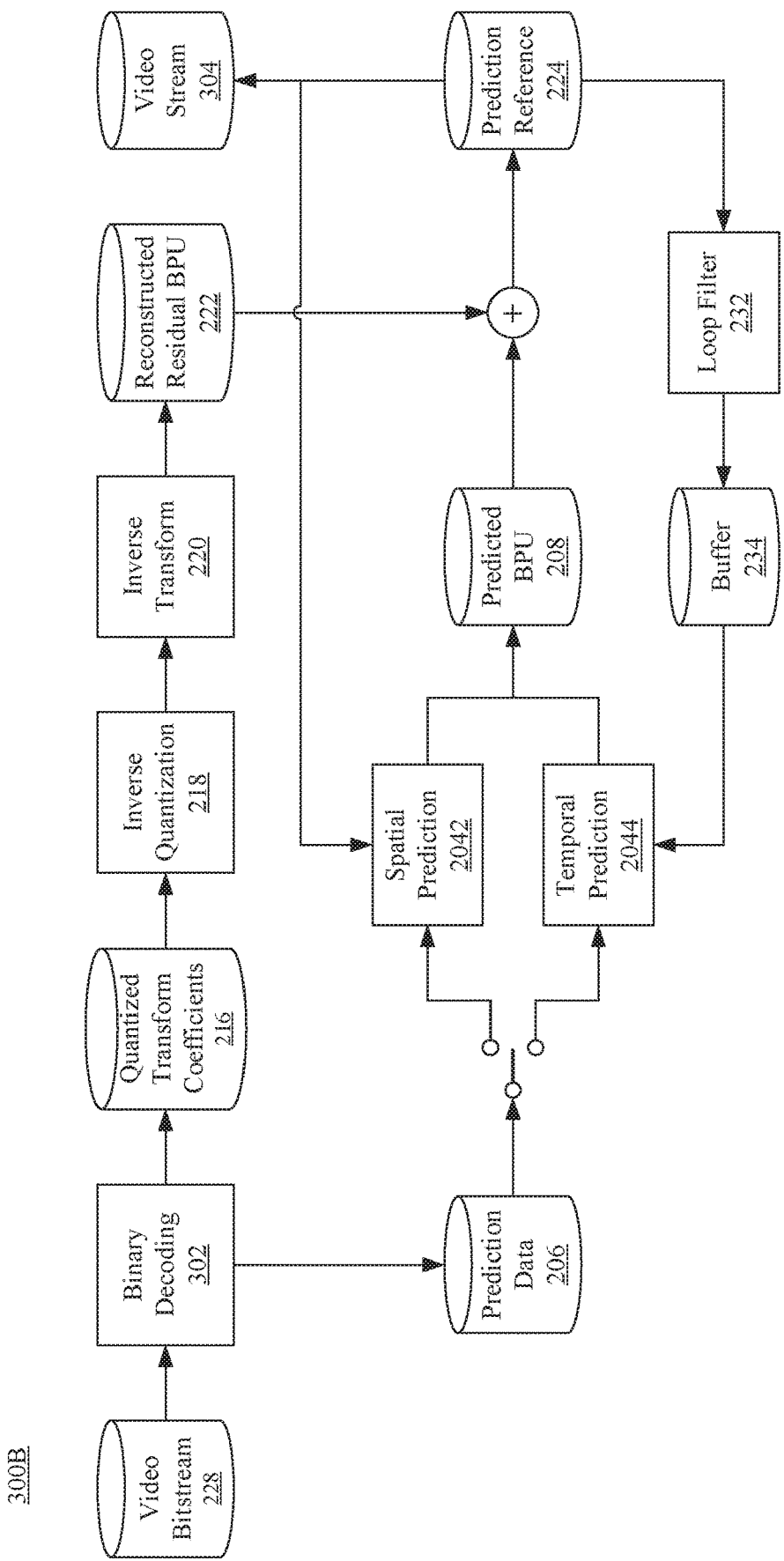
FIG. 3B illustrates a schematic diagram of another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4A:
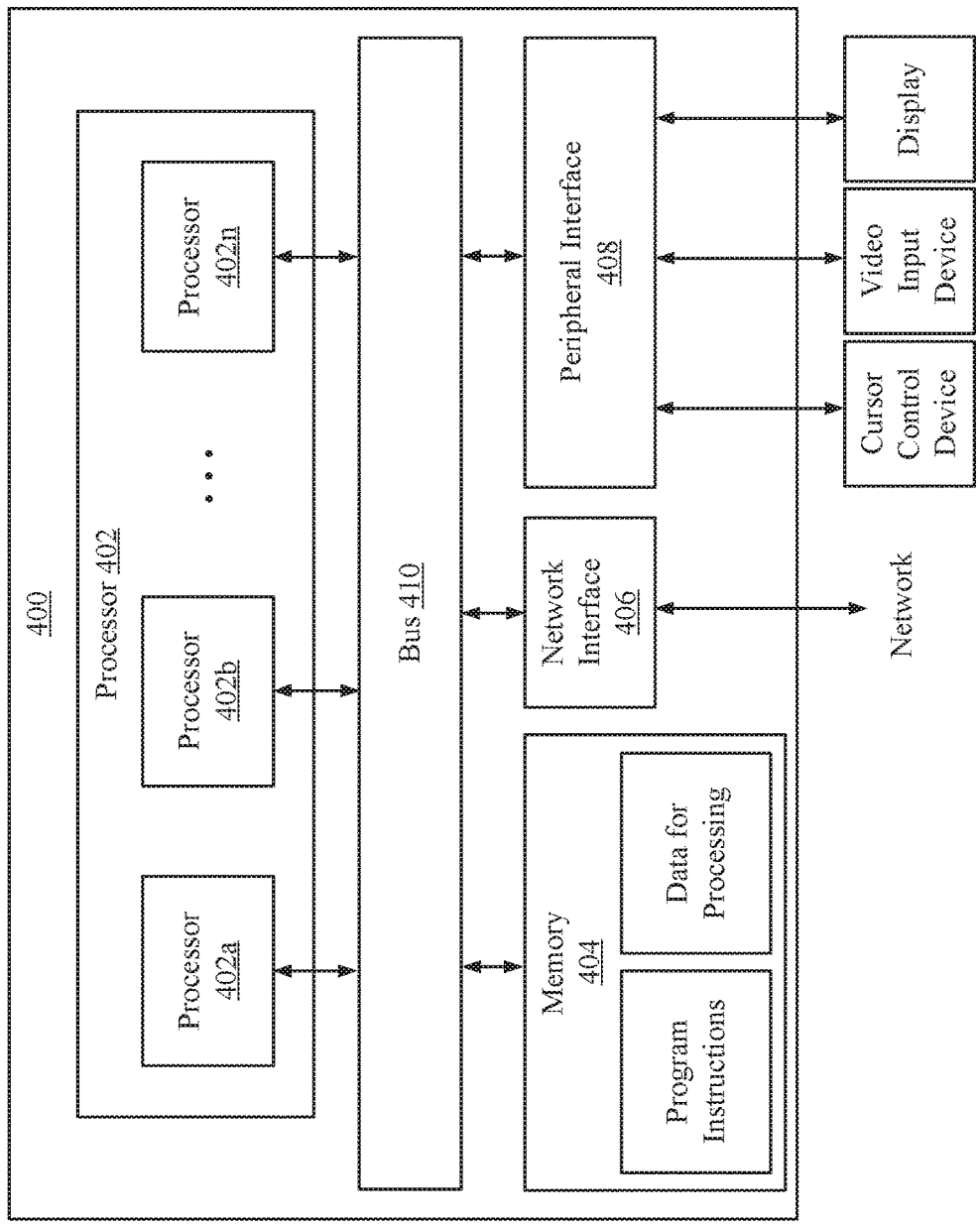
FIG. 4A illustrates a block diagram of an exemplary apparatus for encoding or decoding a video, consistent with embodiments of the disclosure.

FIG. 4A is a block diagram of an example apparatus 400 for encoding or decoding a video, consistent with embodiments of the disclosure. As shown in FIG. 4A, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4A, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4A, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4A) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4A, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

For CUs coded using inter prediction, reference blocks in previously decoded pictures (i.e. reference pictures) are identified as predictors. The relative position between a reference block in the reference picture and the coding block in the current picture is defined as motion vector (MV). The motion information of the current CU is specified by the number of predictors, reference picture index(es) and the corresponding MV(s). After obtaining the prediction by motion compensation based on the motion information, the residual between the prediction signal and the original signal may additionally go through transformation, quantization and entropy coding, before being packed into the output bitstream.

In some circumstances, the motion information of spatial and temporal neighboring CUs of the current CU may be used to predict the motion information of the current CU. Merge mode can be adopted to reduce the coding bits of motion information. In the merge mode, the motion information is derived from the spatial or temporal neighboring blocks, and the merge index can be signaled to indicate from which neighboring block is the motion information derived.

In HEVC, merge candidate list can be constructed based on the following candidates:

(1) up to four spatial merge candidates that are derived from five spatial neighboring blocks;

(2) one temporal merge candidate derived from the temporal co-located blocks;

(3) additional merge candidates including combined bi-predictive candidates and zero motion vector candidates.

Figure 4B:
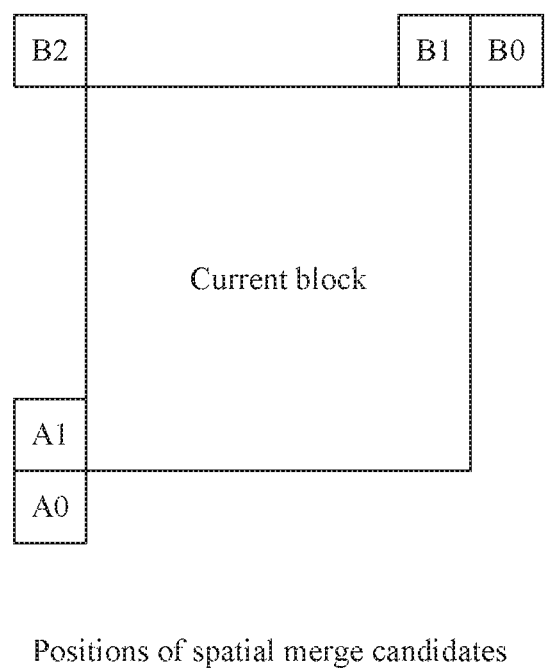
FIG. 4B illustrates exemplary positions of spatial merge candidates, consistent with embodiments of the disclosure.

The first candidates in the merge candidate list are the spatial neighbors. FIG. 4B shows the positions of five spatial candidates. According to the order {A1, B1, B0, A0, B2}, the availability of each candidate position is checked. If a spatial neighboring block is intra predicted or the position is outside of the current slice or tile, it can be considered as unavailable as a merge candidate. In addition, some redundancy checks can be performed to ensure that the motion data from the neighboring blocks is as unique as possible. To reduce complexity due to the redundancy checks, only limited redundancy checks may be performed, and uniqueness may not always be guaranteed. For example, given the order of {A1, B1, B0, A0, B2}, B0 only checks B1, A0 only checks A1, and B2 only checks A1 and B1.

Figure 4C:
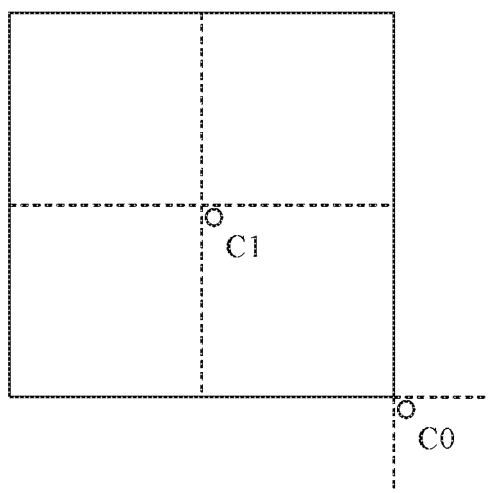
FIG. 4C illustrates exemplary positions of temporal merge candidates, consistent with embodiments of the disclosure.
Figure 5:
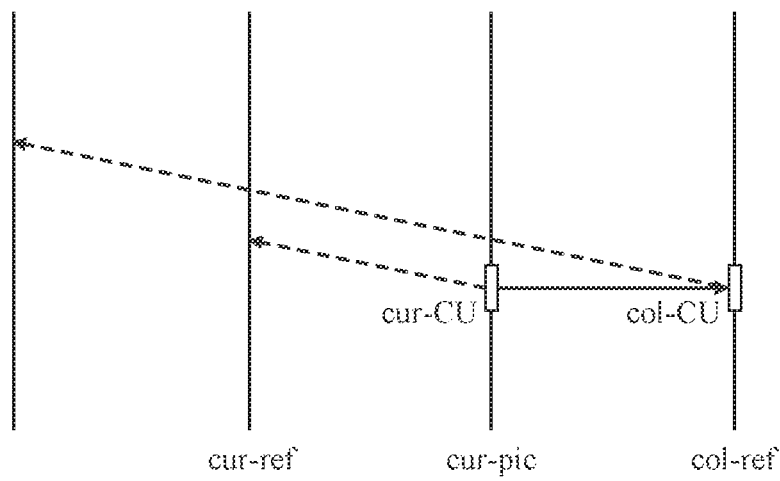
FIG. 5 illustrates exemplary scaling of temporal merge candidates, consistent with embodiments of the disclosure.

For the temporal merge candidate, as illustrated in FIG. 4C, the right bottom position C0 just outside of the collocated block of the reference picture is used if it is available. Otherwise, the center position C1 can be used instead. Which reference picture list is used for the collocated reference picture can be indicated by an index signaled in the slice header. The MV of the co-located block can be scaled based on the picture order count (POC) differences before inserting it into the merge list, as illustrated in FIG. 5.

The maximum number of merge candidates C can be specified in the slice header. If the number of available merge candidates found (including the temporal candidate) is larger than C, only the first C−1 spatial candidates and the temporal candidate are retained. Otherwise, if the number of merge candidates available is less than C, additional candidates are generated until the number is equal to C. This can simplify the parsing and makes it more robust, as the ability to parse the coded data is not dependent on the number of available merge candidates. In the common test condition (CTC), the maximum number of merge candidates C is set to 5.

For B slices, additional merge candidates are generated by combining two available candidates according to a pre-defined order for reference picture list 0 and list 1. For example, the first generated candidate uses the first merge candidate for list 0 and the second merge candidate for list 1. HEVC specifies a total of 12 predefined pairs of two motion vectors in the following order in the already constructed merge candidate list as (0, 1), (1, 0), (0, 2), (2, 0), (1, 2), (2, 1), (0, 3), (3, 0), (1, 3), (3, 1), (2, 3), and (3, 2), where (i, j) represents the index of the available merge candidates. Among them, up to five candidates can be included after removing redundant entries.

When the slice is a P slice or the number of merge candidates is still less than C, zero motion vectors associated with reference indices from zero to the number of reference pictures minus one are used to fill any remaining entries in the merge candidate list.

In VVC, the merge candidate list is constructed by including the following five types of candidates in order:
Spatial merge candidates from spatial neighbouring CUs;
Temporal merge candidate from collocated CUs;

History-based motion vector predictor (HMVP) from an FIFO table;

Pairwise average candidates; and

Zero MVs.

Definitions of the spatial merge candidates and temporal merge candidate are the same as in HEVC. After the spatial and temporal merge candidates, HMVP merge candidates are added to the merge list. In HMVP, the motion information of a previously coded block is stored in a table and used as motion vector predictor for the current CU. The table with multiple HMVP candidates is maintained during the encoding/decoding process. The table is reset (emptied) when a new CTU row is encountered. When there is a non-subblock inter-coded CU, the associated motion information is added to the last entry of the table as a new HMVP candidate.

In VVC, the HMVP table size can be set to 6, that is, up to 6 HMVP candidates may be added to the table. When inserting a new motion candidate to the table, a constrained first-in-first-out (FIFO) rule can be utilized where redundancy check is firstly applied to find whether there is an identical HMVP in the table. If found, the identical HMVP is removed from the table and all the HMVP candidates afterwards can be moved forward.

During the merge candidate list construction process, the latest several HMVP candidates in the table are checked in order and inserted to the merge candidate list after the temporal motion vector predictor (TMVP) candidate. Redundancy check can be applied to check the HMVP candidates against the spatial or temporal merge candidates.

After inserting HMVP candidates, pairwise average candidates are added if the merge candidate list is not yet full. Pairwise average candidates are generated by averaging predefined pairs of candidates in the existing merge candidate list. The predefined pairs are defined as {(0, 1), (0, 2), (1, 2), (0, 3), (1, 3), (2, 3)}, where the numbers denote the merge indices in the merge candidate list. The averaged motion vectors are calculated separately for each reference picture list. If both motion vectors are available in one list, these two motion vectors are averaged even when they point to different reference pictures. If only one motion vector is available, the available one is used directly. If no motion vector is available, the list is considered invalid.

When the merge list is still not full after pairwise average merge candidates are added, zero motion vectors are inserted in the end until the maximum merge candidate number is reached.

In VVC, besides the regular merge mode, the construction of merge candidate list can also be used for the merge mode with motion vector difference (MMVD) and triangle partition mode (TPM).

In MMVD, a merge candidate is first selected from the merge candidate list, and then it is further refined by signaled motion vector difference (MVD) information. The size of the MMVD merge candidate list is set to 2. The merge candidate flag can be signaled to specify which one of the two MMVD candidates is used as the base motion vector (MV). The MVD information can be signaled by a distance index and a direction index. Distance index specifies motion magnitude information and indicates the pre-defined offset from the base MV. The relation of the distance index and the pre-defined offset is shown in the example in FIG. 6. The direction index specifies the sign of offset added to the base MV, for example with 0 indicating the positive sign and 1 indicating the negative sign.

In TPM, a CU is split evenly into two triangle-shaped partitions, using either the diagonal split or the anti-diagonal split. Each triangle partition in the CU can be inter-predicted using its own motion. Only uni-prediction is allowed for each partition. That is, each partition has one motion vector and one reference index. The uni-prediction motion constraint is applied to ensure that, similar to bi-prediction, only two motion compensated predictions are needed for each CU. If triangle partition mode is used for the current CU, then a flag indicating the direction of the triangle partition (diagonal or anti-diagonal), and two merge indices (one for each partition) can be further signaled. After predicting each of the triangle partitions, the sample values along the diagonal or anti-diagonal edge are adjusted using a blending processing with adaptive weights. This corresponds to the prediction signal for the whole CU, and transform and quantization process can be applied to the whole CU as in regular inter modes. A merge candidate list can be constructed. The number of maximum TPM merge candidates can be signaled explicitly in the slice header and set to 5 in CTC.

In VVC, the merge candidate list is constructed, including the spatial candidates, temporal candidate, HMVP and pairwise average candidates. For different inter modes, different merge list sizes are applied. For example, the spatial merge candidates can be inserted into the merge list according to the order {A1, B1, B0, A0, B2}. However, the construction process of the spatial merge candidates is unchanged from HEVC to VVC, which fails to take into account the new merge candidates (e.g. HMVP, pairwise average) and the new inter modes (e.g. MMVD, TPM) in VVC. This leads to various drawbacks of current spatial merge candidates.

For example, the order of spatial merge candidates can be improved. The number of spatial merge candidates can be adjusted. Further, the construction of spatial merge candidates is fixed for the regular mode, MMVD and TPM modes, which limits the potential of the merge methods. In addition, the construction of spatial merge candidates is fixed for low-delay pictures and non-low-delay pictures, which decreases the flexibility. In order to address the above and other problems, various solutions are provided in the present disclosure.

Figure 7:
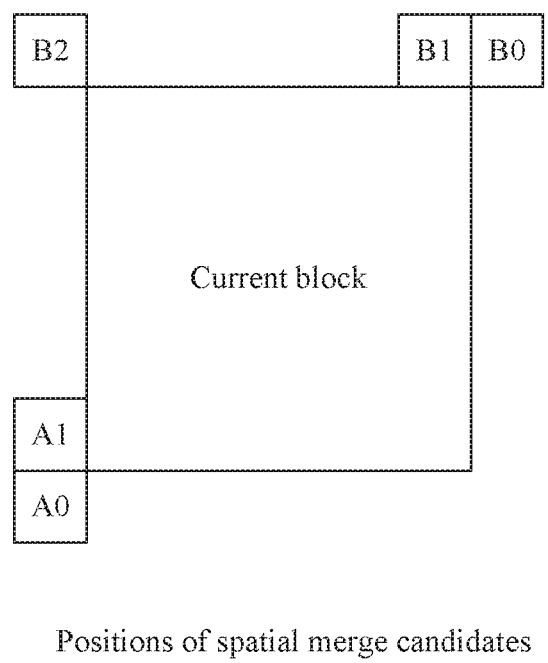
FIG. 7 illustrates exemplary positions of spatial merge candidates, consistent with embodiments of the disclosure.

For example, in some embodiments, the order of the spatial merge candidates can be changed. A new order of spatial merge candidates {B1, A1, B0, A0, B2} can be applied. The locations of spatial neighboring blocks B1, A1, B0, A0 and B2 are illustrated in FIG. 7. In some embodiments, that order can be changed into {B1, A1, B0, A0, B2}.

The new order corresponds to the top neighboring block, left neighboring block, top neighboring block, left neighboring block and above-left neighboring block successively, which alternates between the top and the left neighbors. Moreover, the new order of spatial merge candidates can achieve higher coding performance. As shown in FIG. 8 and FIG. 9, according to some embodiments, the proposed method can obtain 0.05% and 0.21% coding gain on average compared to VTM-6 under random access (RA) and low delay (LD) configurations, respectively.

In some embodiments, the number of spatial merge candidates can be changed. To achieve a better tradeoff between the computational complexity and the coding performance, a reduced number of spatial merge candidates is proposed and applied in various embodiments of the present disclosure. When limiting the number of spatial merge candidates to 2, the construction order {B1, A1} can be applied. For example, the neighboring block B1 can be checked and inserted into the merge list if it is available. Then, the neighboring block A1 can be checked and inserted into the merge list if it is available and not the same as B1. After inserting the spatial merge candidates {B1, A1}, the following TMVP, HMVP and pairwise average candidates can be added into the merge list.

When limiting the number of spatial merge candidates to 3, the construction order {B1, A1, B0} can be applied. The checking order of the neighboring blocks is B1→A1→B0, and the corresponding MVs can be inserted into the merge list if available and not redundant.

When using the spatial merge candidates {B1, A1, B0}, experimental results compared to VTM-6 are shown in the FIG. 10 and FIG. 11. As shown in FIG. 10 and FIG. 11, according to some embodiments, the proposed techniques can achieve 0.00% and 0.10% coding gain under RA and LD configurations.

Further, in some VVC techniques, the total number of merge candidates can be signaled. In some embodiments of the present disclosure, it is proposed to additionally signal the number of spatial merge candidates to provide more flexibility in merge candidate list construction. The number of spatial merge candidates may be set to different values, considering the prediction structure of the current picture. If the current picture is a non-low-delay picture, the number of spatial merge candidates may be set to a first value. A non-low-delay picture can refer to a picture coded using reference pictures from both the past and the future according to the display order. Otherwise, if the current picture is a low-delay picture, the number of spatial merge candidates may be set to a second value. A low-delay picture can refer to a picture coded using only reference pictures from the past according to the display order. The first value may be larger than the second value. The first value and the second value may be explicitly signaled in the bitstream, for example, in the slice header. An example is shown in FIG. 12.

The syntax element num_spatial_merge_cand_minus2 (e.g., element 1201 in FIG. 12) can indicate the number of spatial merge candidates used for the current slice. The value of num_spatial_merge_cand_minus2 can be in the range of 0 to 3, inclusive. When the element num_spatial_merge_cand_minus2 is not present, it can be inferred to be equal to 0.

Depending on the reference pictures used to code the current slice, the slice may be classified as low-delay or non-low-delay, and different numbers of merge candidates may be used. The value of num_spatial_merge_cand_minus2 may be set accordingly by the encoder and sent in the bitstream.

Alternatively, instead of signaling one syntax element in the slice header, two syntax elements, num_spatial_merge_cand_minus2_non_lowdelay and num_spatial_merge_cand_minus2_lowdelay may be signaled in the picture parameter set (PPS) or sequence parameter set (SPS), as shown in FIG. 13 (e.g., element 1301) and FIG. 14 (e.g., element 1401). Further, at the slice level, depending on the slice type, a corresponding number of spatial merge candidates may be used.

The values of num_spatial_merge_cand_minus2_non_lowdelay and num_spatial_merge_cand_minus2_lowdelay can respectively indicate the numbers of spatial merge candidates used for the non-low-delay slice and low-delay slice. The values of num_spatial_merge_cand_minus2_non_lowdelay and num_spatial_merge_cand_minus2_lowdelay can be in the range of 0 to 3, inclusive. When num_spatial_merge_cand_minus2_non_lowdelay or num_spatial_merge_cand_minus2_lowdelay is not present, it can be inferred to be equal to 0.

In some embodiments, separate construction orders of spatial merge candidates can be applied for different inter modes. For example, two construction orders of spatial merge candidates can be considered, including {B1, A1, B0, A0, B2} and {A1, B1, B0, A0, B2}. For the regular merge mode, MMVD mode and TPM mode, different construction orders can be adopted. In some embodiments, it is proposed that {B1, A1, B0, A0, B2} be used for the regular merge mode and TPM mode, and {A1, B1, B0, A0, B2} be used for the MMVD mode. The experimental results of an exemplary embodiment are shown in the FIG. 15 and FIG. 16. It is observed that the proposed method can achieve 0.07% and 0.16% coding gain on average under RA and LD configurations, respectively.

Based on the present disclosure, a person skilled in the art can appreciate that other combinations of spatial merge candidate order and merge mode may be used. For example, {B1, A1, B0, A0, B2} may be used for the regular merge mode only, and {A1, B1, B0, A0, B2} may be used for the MMVD mode and the TMP mode.

In some embodiments, adaptive construction order of spatial merge candidates can be applied based on frame types. For example, different spatial merge candidate construction methods can be applied for different types of inter coded pictures, such as low-delay and non-low-delay pictures. In some embodiments, for the low-delay pictures, the construction order {B1, A1, B0, A0, B2} of spatial merge candidates can be used for the regular merge mode, TPM mode and MMVD mode. For the non-low-delay pictures, the construction order {B1, A1, B0, A0, B2} of spatial merge candidates can be used for the regular merge mode and TPM mode, and the construction order {A1, B1, B0, A0, B2} of spatial merge candidates can be used for the MMVD mode. The experimental results of an exemplary embodiment are shown in the FIG. 17 and FIG. 18. It is observed that the proposed method can achieve 0.08% and 0.21% coding gain on average under RA and LD configurations, respectively.

Figure 19:
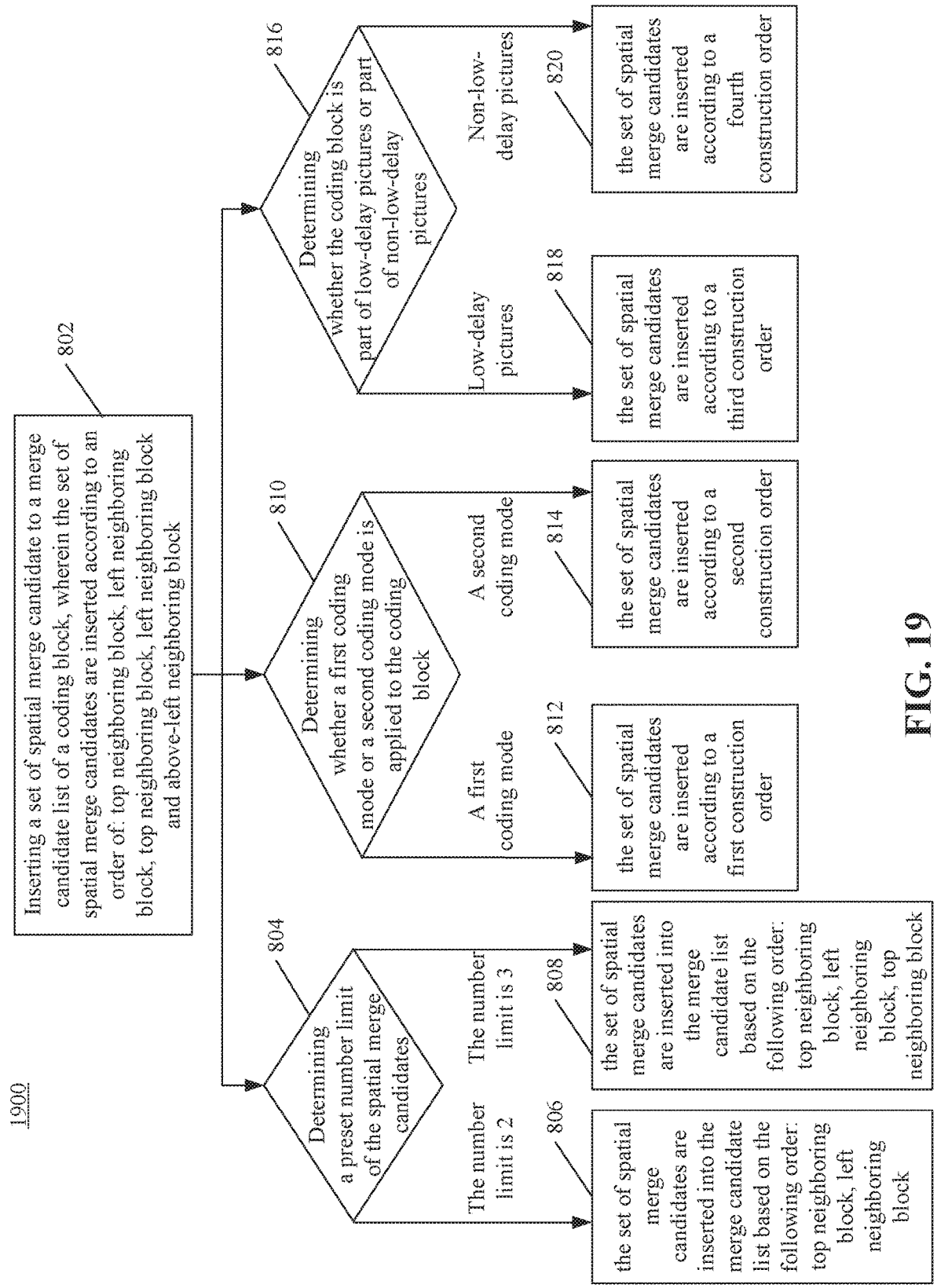
FIG. 19 illustrates a flowchart of an exemplary video processing method, consistent with embodiments of the disclosure.

FIG. 19 illustrates a flowchart of an exemplary video processing method 1900, consistent with embodiments of the disclosure. In some embodiments, method 1900 can be performed by an encoder, a decoder, one or more software or hardware components of an apparatus (e.g., apparatus 400 of FIG. 4A). For example, a processor (e.g., processor 402 of FIG. 4A) can perform method 1900. In some embodiments, method 1900 can be implemented by a computer program product, embodied in a computer-readable medium, including computer-executable instructions, such as program code, executed by computers (e.g., apparatus 400 of FIG. 4A).

In step 802, a set of spatial merge candidates can be inserted to a merge candidate list of a coding block, e.g., by an encoder, a decoder, or one or more software or hardware components of an apparatus (e.g., apparatus 400 of FIG. 4A). In VVC, the order of the spatial merge candidates can be improved. The set of spatial merge candidates can be inserted according to an order of: top neighboring block, left neighboring block, top neighboring block, left neighboring block and above-left neighboring block. For example, a new order of spatial merge candidates {B1, A1, B0, A0, B2} is shown in FIG. 7.

The number of the spatial merge candidates can be adjusted. In step 804, a preset number limit of the spatial merge candidates is determined.

In step 806, if the number limit is 2, the set of spatial merge candidates are inserted into the merge candidate list based on the following order: top neighboring block, left neighboring block. When limiting the number of spatial merge candidates to 2, the construction order {B1, A1} can be applied. For example, the neighboring block B1 can be checked and inserted into the merge list if it is available. Then, the neighboring block A1 can be checked and inserted into the merge list if it is available and not the same as B1. After inserting the spatial merge candidates {B1, A1}, the following TMVP, HMVP and pairwise average candidates can be added into the merge list.

In step 808, if the number limit is 3, the set of spatial merge candidates are inserted into the merge candidate list based on the following order: top neighboring block, left neighboring block, top neighboring block. When limiting the number of spatial merge candidates to 3, the construction order {B1, A1, B0} can be applied. The checking order of the neighboring blocks is B1→A1→B0, and the corresponding MVs can be inserted into the merge list if available and not redundant.

In some embodiments, at least one of the following can be added to the merge candidate list: a temporal merge candidate from collocated coding units, a history-based motion vector predictor (HMVP) from a First-In, First-Out (FIFO) table, a pairwise average candidate, or a zero motion vector.

In HMVP, motion information of a previously coded block is stored in the FIFO table and used as the motion vector predictor for a current coding unit. The table with multiple HMVP candidates is maintained during the encoding/decoding process. The table is reset (emptied) when a new CTU row is encountered. When there is a non-subblock inter-coded coding unit, motion information associated with a non-subblock inter-coded coding unit is added to the last entry of the FIFO table as a new HMVP candidate.

The pairwise average candidate is generated by averaging pairs of candidates in the merge candidate list and is added to the merge candidate list after one or more HMVPs being added to the merge candidate list in response to the merge candidate list not being full.

When the merge list is still not full after pairwise average merge candidates are added, the zero motion vector is inserted in the end of the merge candidate list until a maximum merge candidate number is reached.

In step 810, whether a first coding mode or a second coding mode is applied to the coding block is determined by, e.g., the encoder or the decoder. The first coding mode is different from the second coding mode. In some embodiments, each of the first coding mode and the second coding mode can be one of a regular merge mode, a merge mode with motion vector difference (MMVD), and a triangle partition mode (TPM).

In step 812, when a first coding mode is applied to the coding block, the set of spatial merge candidates are inserted according to a first construction order. For example, in MMVD, a merge candidate is first selected from the merge candidate list, and then is refined by signaled motion vector difference (MVD) information, and a merge candidate flag is signaled to specify which one of the two MMVD candidates is used as a base motion vector. The MVD information can be signaled by a distance index and a direction index. Distance index specifies motion magnitude information and indicates the pre-defined offset from the base MV. The relation of the distance index and the pre-defined offset is shown in the example in FIG. 6. The direction index specifies the sign of offset added to the base MV, for example with 0 indicating the positive sign and 1 indicating the negative sign.

In step 814, when a second coding mode is applied to the coding block, the set of spatial merge candidates are inserted according to a second construction order. For example, in TPM, a coding unit is split evenly into two triangle-shaped partitions, using at least one of a diagonal split or an anti-diagonal split. Each triangle partition in the CU can be inter-predicted using its own motion. Only uni-prediction is allowed for each partition. That is, each partition has one motion vector and one reference index.

In step 816, whether the coding block is part of low-delay pictures or non-low-delay pictures is determined.

In step 818, when the coding block is part of low-delay pictures, the set of spatial merge candidates are inserted according to a third construction order. In some embodiments, for the low-delay pictures, the construction order {B1, A1, B0, A0, B2} of spatial merge candidates can be used for the regular merge mode, TPM mode and MMVD mode.

In step 820, when the coding block is part of non-low-delay pictures, the set of spatial merge candidates are inserted according to a fourth construction order. The third construction order is different from the fourth construction order. The third construction order and the fourth construction order are used for the merge mode with motion vector difference. In some embodiments, for the non-low-delay pictures, the construction order {B1, A1, B0, A0, B2} of spatial merge candidates can be used for the regular merge mode and TPM mode, and the construction order {A1, B1, B0, A0, B2} of spatial merge candidates can be used for the MMVD mode.

Consistent with the present disclosure, a person skilled in the art would appreciate that one or more the above-described methods may be used in combination or may be used separately. For example, the techniques adopting a reduced number of spatial merge candidates can be used in combination with the proposed methods of using separate construction orders of spatial merge candidates for different inter modes.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

The embodiments may further be described using the following clauses:

1. A video processing method, comprising:
inserting a set of spatial merge candidates to a merge candidate list of a coding block,
wherein the set of spatial merge candidates are inserted according to an order of: top neighboring block, left neighboring block, top neighboring block, left neighboring block and above-left neighboring block.

2. The method according to clause 1, further comprising:
adding to the merge candidate list at least one of: a temporal merge candidate from collocated coding units, a history-based motion vector predictor (HMVP) from a First-In, First-Out (FIFO) table, a pairwise average candidate, or a zero motion vector.

3. The method according to clause 2, wherein motion information of a previously coded block is stored in the FIFO table and used as the motion vector predictor for a current coding unit.

4. The method according to any one of clauses 2 and 3, wherein motion information associated with a non-subblock inter-coded coding unit is added to the last entry of the FIFO table as a new HMVP candidate.

5. The method according to clause 2, wherein
the pairwise average candidate is generated by averaging pairs of candidates in the merge candidate list and is added to the merge candidate list after one or more HMVPs being added to the merge candidate list in response to the merge candidate list not being full.

6. The method according to clause 2, wherein
the zero motion vector is inserted in the end of the merge candidate list until a maximum merge candidate number is reached.

7. A video processing method, comprising:
inserting a set of spatial merge candidates to a merge candidate list of a coding block, based on a preset number limit of the spatial merge candidates,
wherein if the number limit is 2, the set of spatial merge candidates are inserted into the merge candidate list based on the following order: top neighboring block, left neighboring block; and
wherein if the number limit is 3, the set of spatial merge candidates are inserted into the merge candidate list based on the following order: top neighboring block, left neighboring block, top neighboring block.

8. The method according to clause 7, wherein
in response to a current picture having been coded using a past reference picture and a future reference picture according to a display order, a number of the spatial merge candidates is set to a first value; and
in response to the current picture having been coded using a past reference picture from according to the display order, the number of the spatial merge candidates is set to a second value less than the first value.

9. The method according to clause 7, further comprising:
signaling a number of spatial merge candidates inserted in the merge candidate list.

10. The method according to any one of clauses 7-9, further comprising:
adding to the merge candidate list at least one of: a temporal merge candidate from collocated coding units, a history-based motion vector predictor (HMVP) from a FIFO table, a pairwise average candidate, or a zero motion vector.

11. The method according to clause 10, wherein
motion information of a previously coded block is stored in the FIFO table and used as the motion vector predictor for a current coding unit.

12. The method according to any one of clauses 10 and 11, wherein
motion information associated with a non-subblock inter-coded coding unit is added to the last entry of the FIFO table as a new HMVP candidate.

13. The method according to clause 10, wherein
the pairwise average candidate is generated by averaging pairs of candidates in the merge candidate list and is added to the merge candidate list after one or more HMVPs being added to the merge candidate list in response to the merge candidate list not being full.

14. The method according to clause 10, wherein
the zero motion vector is inserted in the end of the merge candidate list until a maximum merge candidate number is reached.

15. A video processing method, comprising:
inserting a set of spatial merge candidates to a merge candidate list of a coding block, wherein:
when a first coding mode is applied to the coding block, the set of spatial merge candidates are inserted according to a first construction order; and
when a second coding mode is applied to the coding block, the set of spatial merge candidates are inserted according to a second construction order,
the first construction order being different from the second construction order.

16. The method according to clause 15, wherein the first and second coding modes are two different modes selected from:
a regular merge mode, a merge mode with motion vector difference (MMVD), and a triangle partition mode (TPM).

17. The method according to clause 16, wherein
in MMVD, a merge candidate is first selected from the merge candidate list, and then is refined by signaled motion vector difference (MVD) information, and a merge candidate flag is signaled to specify which one of the two MMVD candidates is used as a base motion vector.

18. The method according to clause 16, wherein
in TPM, a coding unit is split evenly into two triangle-shaped partitions, using at least one of a diagonal split or an anti-diagonal split.

19. The method according to any one of clauses 15 and 16, further comprising:
adding to the merge candidate list at least one of: a temporal merge candidate from collocated coding units, a history-based motion vector predictor from a FIFO table, a pairwise average candidate, or a zero motion vector.

20. The method according to clause 19, wherein
motion information of a previously coded block is stored in the FIFO table and used as the motion vector predictor for a current coding unit.

21. The method according to any one of clauses 19 and 20, wherein
motion information associated with a non-subblock inter-coded coding unit is added to the last entry of the FIFO table as a new HMVP candidate.

22. The method according to clause 19, wherein
the pairwise average candidate is generated by averaging pairs of candidates in the merge candidate list and is added to the merge candidate list after one or more HMVPs being added to the merge candidate list in response to the merge candidate list not being full.

23. The method according to clause 19, wherein
the zero motion vector is inserted in the end of the merge candidate list until a maximum merge candidate number is reached.

24. A video processing method, comprising:
inserting a set of spatial merge candidates to a merge candidate list of a coding block, wherein:
when the coding block is part of low-delay pictures, the set of spatial merge candidates are inserted according to a first construction order; and
when the coding block is part of non-low-delay pictures, the set of spatial merge candidates are inserted according to a second construction order,
the first construction order being different from the second construction order.

25. The method according to clause 24, wherein
the first construction order and the second construction order are used for a merge mode with motion vector difference (MMVD).

26. The method according to clause 24, further comprising:
adding to the merge candidate list at least one of: a temporal merge candidate from collocated coding units, a history-based motion vector predictor (HMVP) from a FIFO table, a pairwise average candidate, or a zero motion vector.

27. The method according to clause 26, wherein
motion information of a previously coded block is stored in the FIFO table and used as the motion vector predictor for a current coding unit.

28. The method according to any one of clauses 26 and 27, wherein
motion information associated with a non-subblock inter-coded coding unit is added to the last entry of the FIFO table as a new HMVP candidate.

29. The method according to clause 26, wherein
the pairwise average candidate is generated by averaging pairs of candidates in the merge candidate list and is added to the merge candidate list after one or more HMVPs being added to the merge candidate list in response to the merge candidate list not being full.

30. The method according to clause 26, wherein
the zero motion vector is inserted in the end of the merge candidate list until a maximum merge candidate number is reached.

31. A video processing apparatus, comprising:
a memory storing a set of instructions; and
one or more processors configured to execute the set of instructions to cause the apparatus to perform:
inserting a set of spatial merge candidates to a merge candidate list of a coding block,
wherein the set of spatial merge candidates are inserted according to an order of: top neighboring block, left neighboring block, top neighboring block, left neighboring block and above-left neighboring block.

32. The apparatus according to clause 31, wherein the one or more processors configured to execute the set of instructions to cause the apparatus to further perform:
adding to the merge candidate list at least one of: a temporal merge candidate from collocated coding units, a history-based motion vector predictor (HMVP) from a First-In, First-Out (FIFO) table, a pairwise average candidate, or a zero motion vector.

33. The apparatus according to clause 32, wherein
motion information of a previously coded block is stored in the FIFO table and used as the motion vector predictor for a current coding unit.

34. The apparatus according to any one of clauses 32 and 33, wherein motion information associated with a non-subblock inter-coded coding unit is added to the last entry of the FIFO table as a new HMVP candidate.

35. The apparatus according to clause 32, wherein
the pairwise average candidate is generated by averaging pairs of candidates in the merge candidate list and is added to the merge candidate list after one or more HMVPs being added to the merge candidate list in response to the merge candidate list not being full.

36. The apparatus according to clause 32, wherein
the zero motion vector is inserted in the end of the merge candidate list until a maximum merge candidate number is reached.

37. A video processing apparatus, comprising:
a memory storing a set of instructions; and
one or more processors configured to execute the set of instructions to cause the apparatus to perform:
inserting a set of spatial merge candidates to a merge candidate list of a coding block, based on a preset number limit of the spatial merge candidates,
wherein if the number limit is 2, the set of spatial merge candidates are inserted into the merge candidate list based on the following order: top neighboring block, left neighboring block; and
wherein if the number limit is 3, the set of spatial merge candidates are inserted into the merge candidate list based on the following order: top neighboring block, left neighboring block, top neighboring block.

38. The apparatus according to clause 37, wherein
in response to a current picture having been coded using a past reference picture and a future reference picture according to a display order, a number of the spatial merge candidates is set to a first value; and
in response to the current picture having been coded using a past reference picture according to the display order, the number of the spatial merge candidates is set to a second value less than the first value.

39. The apparatus according to clause 37, wherein the one or more processors configured to execute the set of instructions to cause the apparatus to further perform:
signaling a number of spatial merge candidates inserted in the merge candidate list.

40. The apparatus according to any one of clauses 37-39, wherein the one or more processors configured to execute the set of instructions to cause the apparatus to further perform:
adding to the merge candidate list at least one of: a temporal merge candidate from collocated coding units, a history-based motion vector predictor (HMVP) from a FIFO table, a pairwise average candidate, or a zero motion vector.

41. The apparatus according to clause 40, wherein
motion information of a previously coded block is stored in the FIFO table and used as the motion vector predictor for a current coding unit.

42. The apparatus according to any one of clauses 40 and 41, wherein
motion information associated with a non-subblock inter-coded coding unit is added to the last entry of the FIFO table as a new HMVP candidate.

43. The apparatus according to clause 40, wherein
the pairwise average candidate is generated by averaging pairs of candidates in the merge candidate list and is added to the merge candidate list after one or more HMVPs being added to the merge candidate list in response to the merge candidate list not being full.

44. The apparatus according to clause 40, wherein
the zero motion vector is inserted in the end of the merge candidate list until a maximum merge candidate number is reached.

45. A video processing apparatus, comprising:
a memory storing a set of instructions; and
one or more processors configured to execute the set of instructions to cause the apparatus to perform:
inserting a set of spatial merge candidates to a merge candidate list of a coding block, wherein:
when a first coding mode is applied to the coding block, the set of spatial merge candidates are inserted according to a first construction order; and
when a second coding mode is applied to the coding block, the set of spatial merge candidates are inserted according to a second construction order,
the first construction order being different from the second construction order.

46. The apparatus according to clause 45, wherein the first and second coding modes are two different modes selected from:
a regular merge mode, a merge mode with motion vector difference (MMVD), and a triangle partition mode (TPM).

47. The apparatus according to clause 46, wherein
in MMVD, a merge candidate is first selected from the merge candidate list, and then is refined by signaled motion vector difference (MVD) information, and a merge candidate flag is signaled to specify which one of the two MMVD candidates is used as a base motion vector.

48. The apparatus according to any one of clauses 45 and 46, wherein
in TPM, a coding unit is split evenly into two triangle-shaped partitions, using at least one of a diagonal split or an anti-diagonal split.

49. The apparatus according to clause 46, wherein
adding to the merge candidate list at least one of: a temporal merge candidate from collocated coding units, a history-based motion vector predictor from a FIFO table, a pairwise average candidate, or a zero motion vector.

50. The apparatus according to clause 49, wherein
motion information of a previously coded block is stored in the FIFO table and used as the motion vector predictor for a current coding unit.

51. The apparatus according to any one of clauses 49 and 50, wherein
motion information associated with a non-subblock inter-coded coding unit is added to the last entry of the FIFO table as a new HMVP candidate.

52. The apparatus according to clause 49, wherein
the pairwise average candidate is generated by averaging pairs of candidates in the merge candidate list and is added to the merge candidate list after one or more HMVPs being added to the merge candidate list in response to the merge candidate list not being full.

53. The apparatus according to clause 49, wherein
the zero motion vector is inserted in the end of the merge candidate list until a maximum merge candidate number is reached.

54. A video processing apparatus, comprising:
a memory storing a set of instructions; and
one or more processors configured to execute the set of instructions to cause the apparatus to perform:
inserting a set of spatial merge candidates to a merge candidate list of a coding block, wherein:
when the coding block is part of low-delay pictures, the set of spatial merge candidates are inserted according to a first construction order; and
when the coding block is part of non-low-delay pictures, the set of spatial merge candidates are inserted according to a second construction order,
the first construction order being different from the second construction order.

55. The apparatus according to clause 54, wherein
the first construction order and the second construction order are used for a merge mode with motion vector difference (MMVD).

56. The apparatus according to clause 54, wherein the one or more processors configured to execute the set of instructions to cause the apparatus to further perform:
adding to the merge candidate list at least one of: a temporal merge candidate from collocated coding units, a history-based motion vector predictor (HMVP) from a FIFO table, a pairwise average candidate, and a zero motion vector.

57. The apparatus according to clause 56, wherein
motion information of a previously coded block is stored in the FIFO table and used as the motion vector predictor for a current coding unit.

58. The apparatus according to any one of clauses 56 and 57, wherein
motion information associated with a non-subblock inter-coded coding unit is added to the last entry of the FIFO table as a new HMVP candidate.

59. The apparatus according to clause 56, wherein
the pairwise average candidate is generated by averaging pairs of candidates in the merge candidate list and is added to the merge candidate list after one or more HMVPs being added to the merge candidate list in response to the merge candidate list not being full.

60. The apparatus according to clause 56, wherein
the zero motion vector is inserted in the end of the merge candidate list until a maximum merge candidate number is reached.

61. A non-transitory computer readable medium that stores a set of instructions that is executable by at least one processor of a computer to cause the computer to perform a video processing method, the method comprising:
inserting a set of spatial merge candidates to a merge candidate list of a coding block,
wherein the set of spatial merge candidates are inserted according to an order of: top neighboring block, left neighboring block, top neighboring block, left neighboring block and above-left neighboring block.

62. The non-transitory computer readable medium according to clause 61, wherein the set of instructions that is executable by the computer to cause the computer to further perform:

adding to the merge candidate list at least one of: a temporal merge candidate from collocated coding units, a history-based motion vector predictor (HMVP) from a First-In, First-Out (FIFO) table, a pairwise average candidate, or a zero motion vector.

63. The non-transitory computer readable medium according to clause 62, wherein motion information of a previously coded block is stored in the FIFO table and used as the motion vector predictor for a current coding unit.

64. The non-transitory computer readable medium according to any one of clauses 62 and 63, wherein motion information associated with a non-subblock inter-coded coding unit is added to the last entry of the FIFO table as a new HMVP candidate.

65. The non-transitory computer readable medium according to clause 62, wherein the pairwise average candidate is generated by averaging pairs of candidates in the merge candidate list and is added to the merge candidate list after one or more HMVPs being added to the merge candidate list in response to the merge candidate list not being full.

66. The non-transitory computer readable medium according to clause 62, wherein the zero motion vector is inserted in the end of the merge candidate list until a maximum merge candidate number is reached.

67. A non-transitory computer readable medium that stores a set of instructions that is executable by at least one processor of a computer to cause the computer to perform a video processing method, the method comprising:

inserting a set of spatial merge candidates to a merge candidate list of a coding block, based on a preset number limit of the spatial merge candidates, wherein if the number limit is 2, the set of spatial merge candidates are inserted into the merge candidate list based on the following order: top neighboring block, left neighboring block; and wherein if the number limit is 3, the set of spatial merge candidates are inserted into the merge candidate list based on the following order: top neighboring block, left neighboring block, top neighboring block.

68. The non-transitory computer readable medium according to clause 67, wherein in response to a current picture having been coded using a past reference picture and a future reference picture according to a display order, a number of the spatial merge candidates is set to a first value; and in response to the current picture having been coded using a past reference picture according to the display order, the number of the spatial merge candidates is set to a second value less than the first value.

69. The non-transitory computer readable medium according to clause 67, wherein the set of instructions that is executable by the computer to cause the computer to further perform:

signaling a number of spatial merge candidates inserted in the merge candidate list.

70. The non-transitory computer readable medium according to any one of clauses 67-69, wherein at least one processor configured to execute the set of instructions to cause the computer to further perform:

adding to the merge candidate list at least one of: a temporal merge candidate from collocated coding units, a history-based motion vector predictor (HMVP) from a FIFO table, a pairwise average candidate, and a zero motion vector.

71. The non-transitory computer readable medium according to clause 70, wherein motion information of a previously coded block is stored in the FIFO table and used as the motion vector predictor for a current coding unit.

72. The non-transitory computer readable medium according to any one of clauses 70 and 71, wherein motion information associated with a non-subblock inter-coded coding unit is added to the last entry of the FIFO table as a new HMVP candidate.

73. The non-transitory computer readable medium according to clause 70, wherein the pairwise average candidate is generated by averaging pairs of candidates in the merge candidate list and is added to the merge candidate list after one or more HMVPs being added to the merge candidate list in response to the merge candidate list not being full.

74. The non-transitory computer readable medium according to clause 70, wherein the zero motion vector is inserted in the end of the merge candidate list until a maximum merge candidate number is reached.

75. A non-transitory computer readable medium that stores a set of instructions that is executable by at least one processor of a computer to cause the computer to perform a video processing method, the method comprising:

inserting a set of spatial merge candidates to a merge candidate list of a coding block, wherein:

when a first coding mode is applied to the coding block, the set of spatial merge candidates are inserted according to a first construction order; and when a second coding mode is applied to the coding block, the set of spatial merge candidates are inserted according to a second construction order, the first construction order being different from the second construction order.

76. The non-transitory computer readable medium according to clause 75, wherein the first and second coding modes are two different modes selected from:

a regular merge mode, a merge mode with motion vector difference (MMVD), and a triangle partition mode (TPM).

77. The non-transitory computer readable medium according to clause 76, wherein in MMVD, a merge candidate is first selected from the merge candidate list, and then is refined by signaled motion vector difference (MVD) information, and a merge candidate flag is signaled to specify which one of the two MMVD candidates is used as a base motion vector.

78. The non-transitory computer readable medium according to clause 76, wherein in TPM, a coding unit is split evenly into two triangle-shaped partitions, using at least one of a diagonal split or an anti-diagonal split.

79. The non-transitory computer readable medium according to any one of clauses 75 and 76, wherein adding to the merge candidate list at least one of: a temporal merge candidate from collocated coding units, a history-based motion vector predictor from a FIFO table, a pairwise average candidate, and a zero motion vector.

80. The non-transitory computer readable medium according to clause 79, wherein motion information of a previously coded block is stored in the FIFO table and used as the motion vector predictor for a current coding unit.

81. The non-transitory computer readable medium according to any one of clauses 79 and 80, wherein motion information associated with a non-subblock inter-coded coding unit is added to the last entry of the FIFO table as a new HMVP candidate.

82. The non-transitory computer readable medium according to 79, wherein the pairwise average candidate is generated by averaging pairs of candidates in the merge candidate list and is added to the merge candidate list after one or more HMVPs being added to the merge candidate list in response to the merge candidate list not being full.

83. The non-transitory computer readable medium according to clause 79, wherein the zero motion vector is inserted in the end of the merge candidate list until a maximum merge candidate number is reached.

84. A non-transitory computer readable medium that stores a set of instructions that is executable by at least one processor of a computer to cause the computer to perform a video processing method, the method comprising:

inserting a set of spatial merge candidates to a merge candidate list of a coding block, wherein:

when the coding block is part of low-delay pictures, the set of spatial merge candidates are inserted according to a first construction order; and when the coding block is part of non-low-delay pictures, the set of spatial merge candidates are inserted according to a second construction order, the first construction order being different from the second construction order.

85. The non-transitory computer readable medium according to clause 84, wherein the first construction order and the second construction order are used for a merge mode with motion vector difference (MMVD).

86. The non-transitory computer readable medium according to clause 84, wherein the set of instructions that is executable by the computer to cause the computer to further perform:

adding to the merge candidate list at least one of: a temporal merge candidate from collocated coding units, a history-based motion vector predictor (HMVP) from a FIFO table, a pairwise average candidate, and a zero motion vector.

87. The non-transitory computer readable medium according to clause 86, wherein motion information of a previously coded block is stored in the FIFO table and used as the motion vector predictor for a current coding unit.

88. The non-transitory computer readable medium according to any one of clauses 86 and 87, wherein motion information associated with a non-subblock inter-coded coding unit is added to the last entry of the FIFO table as a new HMVP candidate.

89. The non-transitory computer readable medium according to clause 86, wherein the pairwise average candidate is generated by averaging pairs of candidates in the merge candidate list and is added to the merge candidate list after one or more HMVPs being added to the merge candidate list in response to the merge candidate list not being full.

90. The non-transitory computer readable medium according to clause 86, wherein the zero motion vector is inserted in the end of the merge candidate list until a maximum merge candidate number is reached.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method, comprising:

inserting a set of spatial merge candidates to a merge candidate list of a coding block, wherein the set of spatial merge candidates are inserted according to an order of: top neighboring block, left neighboring block, top-right neighboring block, bottom-left neighboring block and top-left neighboring block, wherein the order of: top neighboring block, left neighboring block, top-right neighboring block, bottom-left neighboring block and top-left neighboring block is top neighboring block B1, left neighboring block A1, top-right neighboring block B0, bottom-left neighboring block A0, and top-left neighboring block B2.

2. The method according to claim 1, further comprising:

adding to the merge candidate list at least one of: a temporal merge candidate from collocated coding units, a history-based motion vector predictor (HMVP) from a First-In, First-Out (FIFO) table, a pairwise average candidate, or a zero motion vector.

3. The method according to claim 2, wherein motion information of a previously coded block is stored in the FIFO table and used as the motion vector predictor for a current coding unit.

4. The method according to claim 3, wherein motion information associated with a non-subblock inter-coded coding unit is added to the last entry of the FIFO table as a new HMVP candidate.

5. The method according to claim 2, wherein the pairwise average candidate is generated by averaging pairs of candidates in the merge candidate list and is added to the merge candidate list after one or more HMVPs being added to the merge candidate list in response to the merge candidate list not being full.

6. The method according to claim 2, wherein the zero motion vector is inserted in the end of the merge candidate list until a maximum merge candidate number is reached.

7. A video processing apparatus, comprising:

a memory storing a set of instructions; and one or more processors configured to execute the set of instructions to cause the apparatus to perform:

inserting a set of spatial merge candidates to a merge candidate list of a coding block, wherein the set of spatial merge candidates are inserted according to an order of: top neighboring block, left neighboring block, top-right neighboring block, bottom-left neighboring block and top-left neighboring block, wherein the order of: top neighboring block, left neighboring block, top-right neighboring block, bottom-left neighboring block and top-left neighboring block is top neighboring block B1, left neighboring block A1, top-right neighboring block B0, bottom-left neighboring block A0, and top-left neighboring block B2.

8. The apparatus according to claim 7, wherein the one or more processors configured to execute the set of instructions to cause the apparatus to further perform:
adding to the merge candidate list at least one of: a temporal merge candidate from collocated coding units, a history-based motion vector predictor (HMVP) from a First-In, First-Out (FIFO) table, a pairwise average candidate, or a zero motion vector.

9. The apparatus according to claim 8, wherein
motion information of a previously coded block is stored in the FIFO table and used as the motion vector predictor for a current coding unit.

10. The apparatus according to claim 9, wherein
motion information associated with a non-subblock inter-coded coding unit is added to the last entry of the FIFO table as a new HMVP candidate.

11. The apparatus according to claim 8, wherein
the pairwise average candidate is generated by averaging pairs of candidates in the merge candidate list and is added to the merge candidate list after one or more HMVPs being added to the merge candidate list in response to the merge candidate list not being full.

12. The apparatus according to claim 8, wherein
the zero motion vector is inserted in the end of the merge candidate list until a maximum merge candidate number is reached.

13. A non-transitory computer readable medium that stores a set of instructions that is executable by at least one processor of a computer to cause the computer to perform a video processing method, the method comprising:
inserting a set of spatial merge candidates to a merge candidate list of a coding block,
wherein the set of spatial merge candidates are inserted according to an order of: top neighboring block, left neighboring block, top-right neighboring block, bottom-left neighboring block and top-left neighboring block, wherein the order of: top neighboring block, left neighboring block, top-right neighboring block, bottom-left neighboring block and top-left neighboring block is top neighboring block B1, left neighboring block A1, top-right neighboring block B0, bottom-left neighboring block A0, and top-left neighboring block B2.

14. The non-transitory computer readable medium according to claim 13, wherein the set of instructions that is executable by the computer to cause the computer to further perform:
adding to the merge candidate list at least one of: a temporal merge candidate from collocated coding units, a history-based motion vector predictor (HMVP) from a First-In, First-Out (FIFO) table, a pairwise average candidate, or a zero motion vector.

15. The non-transitory computer readable medium according to claim 14, wherein
motion information of a previously coded block is stored in the FIFO table and used as the motion vector predictor for a current coding unit.

16. The non-transitory computer readable medium according to claim 15, wherein
motion information associated with a non-subblock inter-coded coding unit is added to the last entry of the FIFO table as a new HMVP candidate.

17. The non-transitory computer readable medium according to claim 14, wherein
the pairwise average candidate is generated by averaging pairs of candidates in the merge candidate list and is added to the merge candidate list after one or more HMVPs being added to the merge candidate list in response to the merge candidate list not being full.

18. The non-transitory computer readable medium according to claim 14, wherein
the zero motion vector is inserted in the end of the merge candidate list until a maximum merge candidate number is reached.

19. A non-transitory computer readable medium storing a bitstream, wherein the bitstream comprises:
an index associated with encoded video data, the index indicating an order for inserting a set of spatial merge candidates to a merge candidate list of a coding block, wherein the index causes a decoder to insert the set of spatial merge candidates to the merge candidate list of the coding block according to the order of top neighboring block B1, left neighboring block A1, top-right neighboring block B0, bottom-left neighboring block A0, and top-left neighboring block B2.

\* \* \* \* \*